United States Patent Office 3,712,866
Patented Jan. 23, 1973

3,712,866
METHOD OF GELLING WATER BEARING COMPOSITIONS CONTAINING THICKENERS
Errol Linton Falconer, Mont-Saint-Hilaire, Quebec, Canada, assignor to Canadian Industries Limited, Montreal, Quebec, Canada
No Drawing. Filed Mar. 26, 1970, Ser. No. 23,081
Claims priority, application Canada, Apr. 23, 1969, 49,569
Int. Cl. B01j *13/00*
U.S. Cl. 252—316
7 Claims

ABSTRACT OF THE DISCLOSURE

A method is provided for the very rapid gelling of cis-hydroxylated polymers, such as galactomannans, in an aqueous medium by adding thereto a selected crosslinking agent consisting of the product obtained by the admixture of a soluble trivalent antimony compound and a soluble hexavalent chromium compound in a polar liquid comprising at least 10% by weight of a glycolic substance having free cis-heydroxyl groups therein. The method is particularly useful in gelling a thickened aqueous explosive slurry but is also useful in a wide range of coating or preservative applications.

This invention relates to a process for gelling aqueous solutions of water-dispersible hydroxylated polymers containing vicinal cis-hydroxyl groups. More particularly, the invention relates to a process for gelling solution of galactomannans, especially galactomannan-thickened water-bearing explosive compositions.

The use of thickening agents or gelling agents for purposes of increasing the viscosity of water-bearing mixtures or water solutions has been known for many years. Common starch is an example of a thickener widely used in both domestic and industrial applications and a wide range of other natural and synthetic products are available for thickening purposes. Among the most wdiely used thickeners are a group of materials generally characterized as hydroxylated polymers containing vicinal cis-hydroxyl groups. The more readily available of these polymers are the ntaural and synthetic polymers based on mannose and galactose and in industry the most commonly used of the natural galactomannans are guar gum and locust bean gum. Suitable synthetic polymers also characterized as hydroxylated polymers containing vicinal cis-hydroxyl groups include, for example, polymerized vinyl and acrylic derivatives of mannose and galactose such as the acrylate ester of galactose and the polyvinyl ester of galacturonic acid.

All of these polymers have the similar property of forming viscous solutions in water, which function is accomplished by absorption by the polymer of large amounts of water or by dissolving in water or both. The degree of thickening and hence the viscosity and fluidity of the water or the water-bearing composition to which these polymers are added will depend on the quantity and kind of the polymer gums used. A wide range of solution properties can be produced by the selection of particular gums and by adjusting the quantities used and the temperature of the reaction medium. Thus these gums have found wide application in the textile, food and pharmaceutical industries and more recently in the explosive industry.

The explosives industry has been particularly active in the exploitation of the guar polysaccharide as a thickener to increase the viscosity of the liquid matrix in the types of water-bearing explosive mixtures known as explosive slurries. These water-bearing or aqueous slurries comprise essentially an oxidizer of the inorganic oxygen-supplying salt type together with sensitizing and/or fuel particles suspended in a viscous matrix of a saturated aqueous solution of the inorganic salt. In addition, these aqueous explosive slurries may also contain other but non-essential ingredients to improve their physical properties or to aid in the mixing or packaging of the explosive product. Because of the relative safety in compounding, handling and transporting these explosive slurries, particular economies have been enjoyed both by the explosive manufacturer and the explosive user. Additionally, because of their physical nature, slurry explosives lend themselves especially well to bulk transportation or to manufacture in mobile truck- or tractor-mounted mixing and pumping vehicles. A pumping vehicle may, for example, transport a pre-mixed slurry directly to the blasting site where the slurry may then be delivered, usually by pumping means, directly into a borehole through a delivery hose. A combination mix/pump vehicle performs the same function except that the actual compounding of the slurry from raw materials may also be undertaken on the vehicle.

For purposes of maintaining the solid particles of the slurry in suspension while at the same time retaining suitable pumping properties, it is generally necessary for the explosive slurry to have a viscosity in the range of 20,000–50,000 centipoises. Such a slurry may be handled adequately by a mechanical pump and will flow through delivery hoses without great difficulty. However, such an explosive slurry suffers from the great disadvantage that it may be easily attacked by water which may be present in the borehole. Such water attack has the effect of breaking down the slurry by dilution and a segregation of the ingredients thereafter results which can cause detonation failure. It has therefore been customary to provide, as an ingredient in an aqueous slurry, materials which are capable of crosslinking the polymeric gum thickeners to product a relatively stiff, water resistant gel in the borehole. The formation of such a gel provides reasonable assurance against attack by borehole water, prevents segregation of the ingredients and ensures the explosive effectiveness of the explosive slurry charges. The crosslinking agents used have a delayed effect so that the slurry may be pumped without difficulty and the crosslinking or gelling effect only takes place after the slurry has been delivered into the borehole or, alternatively, delivered into a package or cartridge in the explosive factory.

The most frequently used additives for performing the crosslinking reaction are the hydrogen-bonding hydroxylated derivatives of tetravalent boron, pentavalent antimony and hexavalent chromium. In practice, guar gum is the thickener of choice and the crosslinkers most widely used in guar gum aqueous systems are borax, potassium pyroantimonate and the soluble chromates and dichromates. These crosslinking chemicals react by hydrogen bond attachment to the cis-hydroxyl groups present in the mannose and galactose units of the polysaccharide but periods as long as an hour or more are generally required to complete the conversion of a guar thickened solution to a water resistant gel. Since it is frequently essential to achieve the formation of a water resistant gel in an explosive slurry soon after delivery of the slurry through a hose and into a borehole, a number of techniques have been attempted to speed up the gelation rate. Amongst these has been the use of elevated temperatures or the addition of an extra amount of thickener to the slurry just before the slurry is pumped to borehole or package. One relatively recent technique which has found some favour involves the inclusion of soluble trivalent antimony derivatives in the slurry during mixing and the terminal addition of chemicals capable of oxidizing trivalent antimony to pentavalent antimony. Thus antimony trioxide or potassium antimony tartrate may be dissolved in a guar-thickened explosive slurry and an approximately equivalent weight of potassium dichromate in aqueous solution may then be incorporated as a terminal addition at the end of the mixing cycle or during pumping to borehole or package. This method of use of antimony derivatives in a premixed slurry composition is, however, not without disadvantages especially in multi-product operations. Also if a terminal addition of an antimony derivative and an oxidizer is made to a slurry, there is exhibited a slow and inhibited rate of crosslink development similar to that experienced, for example, when a finely powdered potassium pyroantimonate is employed as a crosslinking chemical. An additional disadvantage which may be mentioned in using potassium pyroantimonate, is the difficulty of incorporating potassium pyroantimonate into an aqueous slurry explosive composition since this chemical is substantially insoluble in the liquids which are compatible with the explosive slurry.

A number of thickening or gelling methods are disclosed, for example, by Joseph D. Chrisp in U.S. Pat. No. 3,202,556 issued on Aug. 24, 1956, No. 3,301,723 issued on Jan. 31, 1967 and No. 3,372,072 issued on Mar. 5, 1968, by Wesley A. Jordan in U.S. Pat. No. 3,251,781 issued on May 17, 1966 and by William M. Lyerby in U.S. Pat. No. 3,355,336 issued on Nov. 28, 1967.

The present invention allows for the removal of all crosslinking components from the galactomannan prethickened aqueous solution and permits the so thickened system to be crosslinked by means of a single terminal addition of crosslinking agents without compromise of the rate of crosslinking previously attainable with two or more separate additions. In particular, this invention permits the very rapid crosslinking of solutions of cis-hydroxylated polymers by the post addition of a single solution of soluble antimony and chromate compounds.

This invention accordingly provides a process for the gelation of galactomannan gums which comprises combining water and galactomannan gum until viscosity equilibrium of the solution is obtained and thereafter gelling the said solution by combining therewith soluble antimony and chromate compounds in solution in a polar liquid comprising at least 10% by weight of a glycolic substance. The invention additionally provides a process for the rapid crosslinking of galactomannan-thickened aqueous explosive slurry compositions.

To provide a better understanding of the process of the invention, a series of examples and tables are provided below whereby a comparison may be made between crosslinking processes known and used heretofore and the process of the present invention. For purposes of demonstration, the examples employed relate to precursor aqueous inorganic salt slurries for use in explosive compositions thickened by means of galactomannans but this is not to mean that the process demonstrated is not equally applicable to any industrial application where the crosslinking of cis-hydroxylated polymers is an objective.

EXAMPLE 1

A typical guar-thickened aqueous solution of inorganic oxygen-supplying salts was prepared as follows: One part by weight of a high viscosity grade of unmodified guar gum was slurried with 1½ parts by weight of ethylene glycol and then mixed well with 100 parts by weight of a deaerated solution containing 50 parts by weight of ammonium nitrate, 20 parts by weight of sodium nitrate, 0.3 part by weight of zinc nitrate hexahydrate, 14.7 parts by weight of water and a few drops of 2-ethylhexanol defoamer. After viscosity equilibration the viscous solution exhibited a pH of 4.4 and a Brookfield viscosity of about 30,000 centipoises (No. 6 spindle 10 r.p.m.) at 75° F. 100 parts by weight of this viscous solution were then mixed with the crosslinking additives shown in Tables I and II. The results are tabulated to demonstrate the viscosity increase with time resulting from the use of different chemical crosslinking agents.

TABLE I

| Additive | Potassium pyrantimonate (fine powder) | | | |
|---|---|---|---|---|
| Percent added (by weight of guar thickened solution) | 0.005 | 0.05 | 0.1 | 0.4 |
| Viscosity after: | | | | |
| 30 min | 26,000 | 30,000 | 32,000 | 92,000 |
| 1 hr | | 34,000 | 44,000 | Gel |
| 2 hr | 28,000 | 56,000 | Gel | Gel |
| 24 hr | Gel | Gel | Gel | Gel |

TABLE II

| Additive | $Na_2Cr_2O_7 \cdot 2H_2O$ (in aqueous solution) | | | | |
|---|---|---|---|---|---|
| Percent added (by weight of guar thickened solution) | 0.003 | 0.02 | 0.15 | 0.5 | 0.75 |
| Viscosity after: | | | | | |
| 5 min | | | 28,000 | 34,000 | 38,000 |
| 10 min | | | 30,000 | 40,000 | 64,000 |
| 15 min | 26,000 | 35,000 | 32,000 | 58,000 | 100,000 |
| 30 min | | | 38,500 | 156,000 | Gel |
| 2 hr | 26,000 | 58,000 | Gel | Gel | Gel |
| 24 hr | 29,000 | 124,000 | Gel | Gel | |

The results shown in Tables I and II are intended to demonstrate that the addition of known crosslinking chemicals to guar-thickened solutions of inorganic salts will form a gel of these solutions given enough time or enough of the crosslinking additive or both. The best result achieved using potassium pyroantimonate was at the level of 0.4% by weight of additive and a gel was formed in one hour. With 0.5% by weight of sodium dichromate a gel was formed in 30 minutes.

EXAMPLE 2

To the same typical guar-thickened solution described in Example 1 were added two known crosslinking agents, sodium dichromate and potassium antimony tartrate (PAT). Various proportions of each agent were added in solution in a number of polar liquids. In one case the agents were added sequentially and in the other cases the agents were added in combination. The results of the viscosity increasing effect of each addition are shown in Table III below.

TABLE III

| Additives | (a) Sodium dichromate, (b) Potassium antimony tartrate (PAT) | | | | | |
|---|---|---|---|---|---|---|
| Percent added (by wt. of guar thickened solution) | (a) 0.005, (b) 0.005 | (a) 0.005, (b) 0.005 | (a) 0.1, (b) 0.1 | (a) 0.005, (b) 0.005 | (a) 0.005, (b) 0.005 | (a) 0.005, (b) 0.005 |
| Solvent | Water | Water | Water | Formamide | DMSO | Ethylene glycol. |
| Mode of addition | Sequential | Combined | Combined | Combined | Combined | Combined. |
| Viscosity after: | | | | | | |
| 1 min | 30,000 | 26,000 | 26,000 | 26,000 | 28,000 | 44,000. |
| 3 min | 108,000 | | | | | 83,000. |
| 5 min | 160,000 | 26,000 | 26,000 | 26,000 | 31,000 | 118,000. |
| 15 min | Gel | 26,000 | 26,000 | 26,000 | 35,000 | Gel. |
| 24 hr | Gel | 46,000 | Gel | 60,000 | 46,000 | Gel. |

The examination of the results shown in Table III demonstrate the following points:

(a) The sequential addition of sodium dichromate and a soluble antimony salt (PAT) is an effective method of providing rapid crosslinking;

(b) The combined addition of sodium dichromate and PAT in water, formamide or dimethylsulfoxide solutions were ineffective in providing rapid crosslinking;

(c) The combined addition of sodium dichromate and PAT in glycol solution was highly effective in providing rapid crosslinking.

EXAMPLE 3

It has been taught in the prior art that a wide range of oxidizers, such as potassium permanganate or calcium hypochlorite can be usefully employed as additional crosslinking promoters. To demonstrate that a number of oxidizers had little or no effect when used in conjunction with potassium antimony tartrate (PAT), a solution of 2.5 parts by weight of PAT dissolved in glycol was prepared. To portions of this solution were added a number of oxidizers and 0.2% by weight of the combined additive was then added to the typical guar-thickened solution described in Example 1. The results are tabulated in Table IV below.

TABLE IV

| | Additives: 2.5 parts PAT dissolved in ethylene glycol with the following oxidizer additions— | | | |
|---|---|---|---|---|
| | 2.2 $Ca(OCl)_2$ | 1.2 of 30% $H_2O_2$ | 2.5 $NaClO_2$ | 2.5 $KMnO_4$ |
| Percent added (by weight of guar thickened solution) | 0.2 | 0.2 | 0.2 | 0.2 |
| Viscosity after: | | | | |
| 1 hr | 26,000 | 24,000 | 26,000 | 26,000 |
| 24 hrs | 30,000 | 30,000 | 50,000 | 64,000 |

An examination of the results shown in Table IV demonstrates the addition of well known oxidizers to PAT dissolved in glycol can be used to to increase the viscosity of guar solution. Gels were achieved with 1% additions of the mixtures but the crosslinking reaction was in all cases relatively slow and prolonged.

EXAMPLE 4

To demonstrate the effect of replacement of some or all of the glycol with other polar liquids, 2.5 parts by weight of PAT and 2.5 parts by weight of sodium dichromate were dissolved in solvent systems comprising one or more of glycol, formamide and dimethyl sulfoxide. 0.2% by weight of the additive solution was then combined with the typical guar-thickened solution described in Example 1. The results are tabulated in Table V below.

readily to, for example, on-site mixing and delivery of slurry explosives as does a single terminal addition method. It has also been shown that a large portion of the essential glycol solvent of the crosslinking composition may be replaced by other polar liquids. It will be appreciated by those skilled in the art that an effective crosslinker according to the invention need not be limited to the particular composition of potassium antimony tartrate and sodium dichromate preferred and shown in the examples. Equally effective crosslinkers may be prepared from the admixture of any soluble antimony compound and any soluble chromate compound such as, for example, any of the chromates and dichromates of alkali metals and ammonia and mixtures of these in a polar liquid comprising at least 10% by weight of a glycolic substance. The following examples and tables will further demonstrate the particular advantages of the crosslinking process of the invention and point up special properties of the crosslinking composition.

EXAMPLE 5

Solutions containing 2.5 parts by weight of PAT and sodium dichromate, were prepared in (a) 95 parts by weight of ethylene glycol and, (b) a mixed solvent comprising 70 parts by weight of ethylene glycol and 25 parts by weight of formamide. Both solutions were chilled to $-40°$ F. The glycol solution was completely frozen at this temperature while the glycol/formamide solution remained completely fluid. It can be seen therefore that for low temperature applications, for example, on-site explosive mixing and borehole filling in winter, a crosslinking composition in glycol/formamide solution is of particular advantage.

EXAMPLE 6

Solutions containing 2.5 parts by weight of PAT dissolved in glycol or formamide mixed with 2.5 parts by weight of sodium dichromate dissolved in water were prepared in various proportions as shown in Table VI below. 0.2% by weight of the mixture was added to the

TABLE V

| Additives | 2.5 parts PAT and 2.5 parts sodium dichromate by weight dissolved in the solvent systems below | | | | | | | |
|---|---|---|---|---|---|---|---|---|
| Percent added (by wt. of guar thickened solution) | 0.2 | 0.2 | 0.2 | 0.2 | 0.2 | 0.2 | 0.2 | 0.2 |
| Percent by wt.: | | | | | | | | |
| Ethylene glycol | 95 | 70 | 47.5 | 25 | 15 | | 47.5 | |
| Formamide | | 25 | 47.5 | 70 | 80 | 95 | | |
| DMSO | | | | | | | 47.5 | 95 |
| Viscosity after: | | | | | | | | |
| 1 min | 48,000 | 48,000 | 40,000 | 38,000 | 40,000 | 28,000 | 36,000 | 28,000 |
| 5 min | 100,000 | 116,000 | 104,000 | 104,000 | 104,000 | 28,000 | 96,000 | 31,000 |
| 15 min | Gel | Gel | Gel | Gel | Gel | 28,000 | Gel | 35,000 |

An examination of the results shown in Table V demonstrates that substantial proportions and up to 80% or more of the ethylene glycol may be replaced by polar liquids such as formamide and dimethyl sulfoxide. Where total substitution of the glycol was made it can be seen that no rapid gelation took place when the crosslinker composition was added. At least about 10% by weight of glycolic liquid is therefore essential for rapid reaction of the PAT/sodium dichromate crosslinker.

It has been shown in the forgeoing examples and tables that a crosslinker composition comprising a glycolic solution of PAT and sodium dichromate may be employed as a single terminal additive to cause rapid gelation of aqueous solutions which have been thickened by means of cis-hydroxylated polymers. Gelation of comparable rapidity has heretofore only been possible by the sequential addition of PAT and sodium dichromate in separate aqueous solutions. Such sequential additions of crosslinkers requires substantially longer mixing periods since two separate operations are required in order to incorporate the separate ingredients. Additionally, the sequentially added crosslinker method does not lend itself as typical guar thickened solution described in Example 1. The results are tabulated below in Table VI.

TABLE VI
[Effect of Water on Solvent System]

| | 0.2% of 2.5 parts by wt. PAT, 2.5 parts by wt. sodium dichromate additives in the solvents below | | | |
|---|---|---|---|---|
| Percent added (by wt. of guar thickened solution) | | | | |
| Percent: | | | | |
| Ethylene glycol | 90 | 70 | 50 | [1] 50 |
| Formamide | | | | | 60 |
| Water | 5 | 25 | 45 | 45 | 35 |
| Viscosity after: | | | | |
| 1 min | 48,000 | 38,000 | 26,000 | 36,000 | 28,000 |
| 5 min | 112,000 | 86,000 | 30,000 | 98,000 | 28,000 |
| 15 min | Gel | Gel | 34,000 | Gel | 28,000 |
| 1 hr | | | 40,000 | | 28,000 |

[1] 1% additive used instead of 0.2%.

It may be observed from the results shown in Table VI that the liquid crosslinker system was more effective in its viscosity-increasing ability when prepared in solvent systems containing little or no water. The presence of substantial amounts of water adversely affects the activity of the crosslinking chemicals.

EXAMPLE 7

Three crosslinker solutions were prepared containing 2.5 parts by weight of PAT and 2.5 parts by weight of sodium dichromate. The solvent systems were as follows:

Solution A—95 parts glycol
Solution B—70 parts glycol+25 parts formamide
Solution C—70 parts glycol+25 parts water After storage at 75° F. for 4 weeks the solutions were tested as crosslinkers for the typical guar thickened solution described in Example 1. Solutions A and B proved to be highly active while solution C containing a substantial quantity of water was only weakly active.

EXAMPLE 8

A number of substitutes for ethylene glycol may be employed in the crosslinker system of the invention so long as, like ethylene glycol, the materials are characterized by the presence of free cis-hydroxyl groups. Crosslinker solutions were prepared by combining 2.5 parts by weight of PAT, 2.5 parts by weight of sodium dichromate, 50 parts by weight of formamide and 20 parts by weight of water. The balance of the solution was made up to 100 parts by the addition of 25 parts by weight of the components shown below in Table VII. 0.2% by weight of each solution was added to the typical guar thickened solution described in Example 1. The results are tabulated below in Table VII.

TABLE VII
[Substitutes for Ethylene Glycol]

| Percent added (by wt. of guar thickened solution) | 0.2% of additives containing 2.5 parts by wt. PAT, 2.5 parts by wt. sodium dichromate | | | | | |
|---|---|---|---|---|---|---|
| Final ingredient | Mannitol | Sorbitol | Lactose | Sucrose | Glycerine | (¹) |
| Viscosity after: | | | | | | |
| 1 min | 26,000 | 26,000 | 28,000 | 26,000 | 34,000 | 27,000 |
| 5 min | 78,000 | 78,000 | Gel | 26,000 | 88,000 | 104,000 |
| 15 min | Gel | Gel | Gel | 28,000 | Gel | Gel |

¹ 15 mannitol, 10 sucrose.

It can be seen from Table VII that in all cases, except where sucrose was employed alone, that a rapid crosslinking and gelling action occurred. All the compounds employed, except for sucrose, are monomeric or oligomeric glycols, sugar alcohols and monosaccharides containing free cis-hydroxyl groups thus demonstrating the essential presence of cis-hydroxyl groups in the crosslinking solutions of the present invention.

EXAMPLE 9

A number of crosslinker solutions according to the present invention were prepared as shown in Table VIII below. Various quantities of the crosslinker solution were added to the typical guar thickened solution described in Example 1 and the rates of viscosity increase were recorded. The results are tabulated below in Table VIII.

crosslinker solution. An additional observation of the mixes described in Example 9 was a qualitative examination of the mixing effectiveness of the crosslinker solution with the guar thickened solution. The deep green color of the crosslinker solutions showed up as color streaks and indicated the rapidity of localized gelation. Where larger amounts of crosslinker was used, this localized gelation tended to hinder the effective dispersion of the crosslinker throughout the guar solution.

EXAMPLE 10

The preparation of the fast crosslinker of the invention requires little more than the simple combination and dissolution of the ingredients. One simple method of preparation of a 100 pound quantity comprised the following steps. 2.5 pounds of potassium antimony tartrate was dissolved in 25 pounds of formamide with the aid of moderate agitation from a propeller stirrer and slight heating to below 110° F. 70 pounds of ethylene glycol was then mixed in without further heating. 2.5 pounds of sodium dichromate was added and stirred in until dissolution was complete after about 15 minutes at 80° F. A deep green opaque solution was obtained which was stored in stoppered glass containers.

Several systems utilizing the rapid crosslinker of the present invention wherein a wide range of gel consistencies are desired are demonstrated in Examples 11–14.

EXAMPLE 11

A truck equipped for the bulk transportation and pumping of explosives slurries was loaded with an explosive slurry comprising 0.6% by weight of guar gum and 15.5% by weight of water. Sensitizing ingredients were 20% by weight of TNT and 10% by weight of aluminium powder. The truck was equipped for coordinated injection of the crosslinking solution of Example 10 into the pumped slurry at a level of 0.4% of the final output.

Pumping was performed at a rate of 400 pounds of explosive slurry per minute and the explosive was delivered to boreholes through 50 ft. of rubber hose with an inside diameter of 1.5 in. The slurry leaving the end of the hose was uniform and crosslinked to a soft ex- TABLE VIII
[Use of Increased Quantities of Fast Crosslinker]

| | Mix | | | | | |
|---|---|---|---|---|---|---|
| | 1 | 2 | 3 | 4 | 5 | 6 |
| Crosslinker ingredients, parts by wt.: | | | | | | |
| PAT | 2.5 | 2.5 | 2.5 | 2.5 | 5.0 | 5.0 |
| Na₂Cr₂O₇·2H₂O | 2.5 | 2.5 | 2.5 | 2.5 | 5.0 | 5.0 |
| Formamide | 25.0 | 25.0 | 25.0 | 25.0 | 25.0 | 25.0 |
| Ethylene glycol | 70.0 | 70.0 | 70.0 | 70.0 | 65.0 | 65.0 |
| Percent added (by wt. of thickened guar solution) | 0.2 | 0.4 | 0.4 | 0.6 | 0.2 | 0.4 |
| Guar thickened solution, temp., ° F. | 74 | 74 | 92 | 74 | 74 | 74 |
| Initial viscosity | 34,000 | 34,000 | 26,000 | 34,000 | 34,000 | 34,000 |
| Viscosity after: | | | | | | |
| 1 min | 56,000 | 66,000 | 60,000 | 60,000 | 52,000 | 56,000 |
| 3 min | 100,000 | 150,000 | 106,000 | 120,000 | 90,000 | 108,000 |
| 5 min | 120,000 | Gel | 132,000 | 152,000 | 116,000 | 134,000 |
| 15 min | (¹) | Gel | Gel | Gel | Gel | Gel |
| 24 hr | (²) | (²) | (²) | (²) | (²) | (²) |

¹ Soft gel.
² Rigid gel.

An examination of the results shown in Table VIII shows that only a moderate increase in viscosity development occurs with the addition of increased amounts of tensible semifluid gel. No increase of back-pressure was noted because of the crosslinking. Samples of the pumped slurry as delivered to the borehole were collected in plastic tubes in which they converted within a few minutes to more rigid elastic gels. The packaged samples were detonated in a diameter of 3½ inches with a minimum primer of 80 grams of pentolite at 22° F.

EXAMPLE 12

A viscous solution was prepared by blending 485 grams of water with a smooth slurry of 5 grams of high-viscosity guar flour and 0.05 gram of pentachlorophenol (microbiocide) in 10 grams of ethylene glycol. A viscosity of 30,000 centipoises was obtained after about 30 minutes. Two grams of the crosslinker solution of Example 10 were added with rapid stirring for 30 seconds and the resulting solution was very quickly poured on a flat counter and spread smoothly. A crosslinked film sheet formed in about 5 minutes and could be peeled from the smooth surface. This experiment demonstrates the usefulness of this invention in the area of temporary protective coatings and in the impregnation of structures having undesirable levels of liquid and gas permeability.

EXAMPLE 13

A low-density aerated slurry explosive containing 10% by weight of aluminum powder, 14% by weight of water and 0.25% by weight of high-viscosity guar flour was prepared in the laboratory. After standing overnight the density was 1.22 g./cc. and the viscosity was approximately 20,000 centipoises. Rapid crosslinking to a soft elastic gel occurred after mixing 100 parts of this slurry with 0.5 part of the rapid crosslinker of Example 10.

EXAMPLE 14

A pourable slurry formulation was prepared by blending a mixture of nitrate salts with 30.0% by weight of pelleted TNT, 18.0% by weight of water and 0.8% by weight of powdered psyllium seed husks and 0.3% by weight of light paraffin oil. An ingredient mixture of 0.16% by weight of high-viscosity guar flour with 0.32% by weight of ethylene glycol was stirred in for 15 minutes at a temperature of about 80° F. Finally an amount corresponding to 0.02% of a 2.5 parts PAT/2.5 parts sodium dichromate fast crosslinker solution was added and mixed in for a further 5 minutes. The finished slurry was uniform in appearance and could be poured cleanly from polyethylene bags.

While the exact mechanism of the crosslinking action of the rapid crosslinker of the present invention has not been elucidated, it may be postulated from the examples and tables given heretofore that a complex is formed in which two molecules of glycolic substance are linked through a hydroxylated antimony-chromium bridge. The glycol molecules may maintain the correct steric configuration of adjacent terminal hydroxyl groups in the hydroxo-metallic bridge and crosslinking of the polymer molecules then occurs as a concerted process leading to the elimination of the glycol molecule.

Whereas a number of soluble antimony compounds may be utilized with effect in the crosslinker of the invention, many of these, such as potassium pyroantimonate, are insoluble in the substantially non-aqueous liquid of the crosslinking agent. The ready solubility of potassium antimony tratrate (PAT) in the liquid phase of the crosslinker, makes this material the soluble antimony compound of choice.

What I claim is:

1. A process for the gelling of a cis-hydroxylated polymer selected from the group consisting of the natural galactomannans and the polymerized synthetic vinyl and acrylic derivatives of mannose and galactose dispersed or dissolved in an aqueous medium comprising the step of adding to the premixed cis-hydroxylated polymer solution or dispersion a crosslinking agent consisting of the product obtained by the admixture of between about 0.04% and 4.0% by weight of a soluble trivalent antimony compound and between about 0.02% and 5.0% by weight of a soluble hexavalent chromium compound per 100 grams of solution in a polar liquid, said polar liquid comprising at least 10% by weight of a glycolic substance characterized by the presence of free cis-hydroxyl groups therein.

2. A process as claimed in claim 1 wherein the soluble trivalent antimony compound is potassium antimony tartrate.

3. A process as claimed in claim 1 wherein the soluble hexavalent chromium compound is selected from the group consisting of chromates and dichromates of the alkali metals and ammonia and mixtures of these.

4. A process as claimed in claim 1 wherein the soluble hexavalent chromium compound is sodium dichromate.

5. A process as claimed in claim 1 wherein the glycolic substance is selected from the group consisting of monomeric and oligomeric glycols, sugar alcohols and monosaccharides and mixtures of these.

6. A process as claimed in claim 5 wherein the glycol is ethylene glycol.

7. A process as claimed in claim 1 wherein the natural galactomannan is selected from guar gum and locust bean gum.

References Cited

UNITED STATES PATENTS

| | | | |
|---|---|---|---|
| 3,523,048 | 8/1970 | Hopler, Jr. | 149—44 X |
| 3,445,305 | 5/1969 | Lyerly | 149—44 X |
| 3,251,781 | 5/1966 | Jordan | 252—316 |

RICHARD D. LOVERING, Primary Examiner

U.S. Cl. X.R.

106—208; 149—44; 252—182, 311